(12) United States Patent
Fujihara et al.

(10) Patent No.: US 7,867,654 B2
(45) Date of Patent: Jan. 11, 2011

(54) NONAQUEOUS ELECTROLYTE SECONDARY BATTERY

(75) Inventors: Toyoki Fujihara, Moriguchi (JP); Keisuke Minami, Moriguchi (JP); Naoya Nakanishi, Moriguchi (JP); Toshiyuki Nohma, Moriguchi (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 569 days.

(21) Appl. No.: 11/846,727

(22) Filed: Aug. 29, 2007

(65) Prior Publication Data

US 2008/0057396 A1    Mar. 6, 2008

(30) Foreign Application Priority Data

Aug. 29, 2006  (JP)  ............................. 2006-231835
Jun. 21, 2007  (JP)  ............................. 2007-163356

(51) Int. Cl.
    *H01M 4/60* (2006.01)
(52) U.S. Cl. ................. 429/212; 429/231.8; 429/231.95
(58) Field of Classification Search ................. 429/212, 429/217
    See application file for complete search history.

(56) References Cited

U.S. PATENT DOCUMENTS 6,451,480 B1 * 9/2002 Gustafson et al. ........... 429/217
2002/0001752 A1 * 1/2002 Yao et al. ................. 429/231.8

FOREIGN PATENT DOCUMENTS

| JP | 06-163031 A | 6/1994 |
| JP | 2000-182621 A | 6/2000 |
| JP | 2000-195553 A | 7/2000 |
| JP | 2001-093583 A | 4/2001 |
| WO | WO 2004066422 A1 * | 8/2004 |

* cited by examiner

*Primary Examiner*—Melvin C Mayes
*Assistant Examiner*—Melissa Stalder
(74) *Attorney, Agent, or Firm*—Westerman, Hattori, Daniels & Adrian, LLP

(57) ABSTRACT

The nonaqueous electrolyte secondary battery according to one aspect of the present invention includes a lithium-transition metal compound as a positive electrode active material that is capable of intercalating and deintercalating a lithium ion and is represented by $Li_{1+a}Ni_xCO_yM_zO_2$ (wherein M is at least one element selected from Mn, Al, Ti, Zr, Nb, B, Mg and Mo; and $0 \leq a \leq 0.3$, $0.1 \leq x \leq 1$, $0 \leq y \leq 0.5$, $0 \leq z \leq 0.9$, $a+x+y+z=1$), and carbon as a negative electrode active material that is capable of intercalating and deintercalating a lithium ion and is added with a powder of a compound having an imide bond. In the nonaqueous electrolyte secondary battery of the present invention, by incorporating a compound having an imide bond, the initial efficiency of the negative electrode is lowered, so that at a low state of charge of 20% or less, an increasing rate of the IV resistance value becomes small. With such a constitution, a nonaqueous electrolyte secondary battery in which a change in the IV resistance value at a low state of charge is suppressed, which is excellent in output properties and regeneration properties, and which is suitable for an electric vehicle (EV) and a hybrid electric vehicle (HEV), for example, can be provided.

9 Claims, 10 Drawing Sheets

(related art)

(related art)

(related art)

(related art)

NONAQUEOUS ELECTROLYTE SECONDARY BATTERY

BACKGROUND

1. Technical Field

The present invention relates to a nonaqueous electrolyte secondary battery. Particularly, the present invention relates to a nonaqueous electrolyte secondary battery in which a specific positive electrode active material and a negative electrode active material in which a material having an imide bond is added to carbon are used and an increase in an IV resistance value at a low state of charge is suppressed, and which is excellent in load properties and regeneration properties and is suitable for an electric vehicle (EV), a hybrid electric vehicle (HEV) or the like.

2. Related Art

Against a backdrop of a strengthening environmental protection movement, emission regulations of carbon dioxide gases are becoming more strict. In the automobile industry, besides automobiles using fossil fuels, such as gasoline, diesel fuel oil and natural gas, EVs or HEVs have been widely developed. In addition, a sudden rise of the price of fossil fuels in the recent years plays a role of the tail wind for progressing the development of EVs or HEVs. Also in the industry of batteries for the EVs or HEVs, nonaqueous electrolyte secondary batteries represented by lithium ion secondary batteries having a higher energy density than that of other batteries attracts a great deal of attention and the share of nonaqueous electrolyte secondary batteries in the market is rapidly growing.

Here, one example of a specific constitution of a nonaqueous electrolyte secondary battery 10 used as that for an EV or HEV is described referring to FIGS. 5 to 9. FIG. 5 is a perspective view of a cylindrical nonaqueous electrolyte secondary battery. FIG. 6 is an exploded perspective view of a wound electrode body in the cylindrical nonaqueous electrolyte secondary battery. FIG. 7 is a perspective view of a current collector plate used in the cylindrical nonaqueous electrolyte secondary battery. FIG. 8 is a partially broken perspective view showing the state before the current collector plate is pressed against the wound electrode body. Further, FIG. 9 is a partially broken front view showing the state in which the current collector plate is pressed against the wound electrode body and a laser beam is irradiated to the power collection plate.

As shown in FIG. 5, the nonaqueous electrolyte secondary battery 10 includes: a cylinder 11, two covers 12 weld-fixed respectively to both ends of the cylinder 11 to form a cylindrical battery outer can 13, and a wound electrode body 20 (shown in FIG. 6) held in the inside of the cylindrical battery outer can 13. To the two covers 12, a pair of positive and negative electrode terminal mechanisms 14 is respectively attached. The wound electrode body 20 and the electrode terminal mechanisms 14 are connected to each other in the cylindrical battery outer can 13 and the power generated by the wound electrode body 20 can be taken out through a pair of the electrode terminal mechanisms 14. In addition, to each of the covers 12, a gas discharging valve 15 opened and closed by pressure is attached.

As shown in FIG. 6, the wound electrode body 20 is constituted by interposing a belt-shaped separator 23 between a belt-shaped positive electrode 21 and a belt-shaped negative electrode 22 and by winding these pieces in the form of a swirl. The positive electrode 21 includes a positive electrode active material mixture layer $21_2$ constituted by applying a positive electrode mixture slurry to both surfaces of a belt-shaped substrate $21_1$ made of an aluminum foil and the negative electrode 22 includes a negative electrode active material mixture layer $22_2$ constituted by applying a negative electrode mixture slurry including a carbon material to both surfaces of a belt-shaped substrate $22_1$ made of a copper foil. Further, the separator 23 is impregnated with a nonaqueous electrolyte. For securing the output properties of the battery, it is designed that the electrode plate is thin and opposed areas of the positive and negative electrodes to each other are large.

In the positive electrode 21, a non-coated part to which the positive electrode active material mixture layer $21_2$ is not applied is formed and this non-coated part is projected from the end of the separator 23 to be provided as a positive electrode substrate edge part $21_3$. Likewise, in the negative electrode 22, a non-coated part to which the negative electrode active material mixture layer $22_2$ is not applied is formed and this non-coated part is projected from the end of the separator 23 to be provided as a negative electrode substrate edge part $22_3$.

At the both ends of the wound electrode body 20 respectively, a current collector plate 30 is provided and the current collector plate 30 is attached to the positive electrode substrate edge part $21_3$ and the negative electrode substrate edge part $22_3$ by laser welding or electron beam welding. The tip of a lead part 31 protruding from an end of the current collector plate 30 is connected to the electrode terminal mechanisms 14.

As shown in FIGS. 6 and 7, the current collector plate 30 includes a circle plate-shaped main body 32, and in the plate-shaped main body 32, a plurality of arc-shaped convex parts 33 extending in a radial form are molded integrally and are projected to the wound electrode body 20 side. Then, the current collector plate 30 is, as shown by the arrow P in FIG. 8, pressed against the positive electrode substrate edge part $21_3$ or the negative electrode substrate edge part $22_3$ and is, as shown by the broad arrow in FIG. 9, welded thereto by irradiating a laser beam (or electron beam). This welding is performed by spot-welding sequentially while moving the laser beam in the longitudinal direction of the arc-shaped convex part 33, and the bottom part of the arc-shaped convex part 33 and the positive electrode substrate edge part $21_3$ or the negative electrode substrate edge part $22_3$ are welded to each other at a welding part 34. Thus, the positive electrode 21 and the negative electrode 22 are electrically connected respectively to different current collector plates 30 to collect power.

As a positive electrode active material in such a nonaqueous electrolyte secondary battery; a lithium-transition metal composite oxide represented by Formula: $Li_xMO_2$ (wherein M represents at least one of Co, Ni and Mn) capable of reversibly intercalating and deintercalating lithium ion is used. Examples of the lithium-transition metal composite oxide include $LiCoO_2$, $LiNiO_2$, $LiNi_yCo_{1-y}O_2$ (y=0.01 to 0.99), $LiMnO_2$, $LiMn_2O_4$, $LiCo_xMn_yNi_zO_2$ (x+y+z=1) and $LiFePO_4$ and these composite oxides are used individually or in combination.

As the negative electrode active material, used is a material including mainly carbon, such as natural graphite, artificial graphite, carbon black, coke, glassy carbon, carbon fibers and one of or a mixture of a plurality of the baked products of these materials.

As a battery for EVs or HEVs, as described above, a high energy density nonaqueous electrolyte secondary battery having a light weight and outputting a large power has been used; however, besides a countermeasure for the environment, it is also required that advancement of driving performance as a fundamental performance of the automobile is achieved. For the advancement of driving performance, it is required not only to enlarge the battery capacity to enable longer distance driving of the automobile, but also to enlarge the battery output which greatly effects the accelerating performance and hill-climbing performance of the automobile; that is, it is required to render rapid discharge properties satisfactory.

In addition, to suppress the total energy consumption of EVs or HEVs, it is necessary to enable the rapid recovery of power generated by using an electric brake during the deceleration of the automobile. In other words, to render regeneration properties satisfactory; it is also necessary to improve rapid charge properties of the battery. This is because, as is apparent, for example from a driving pattern of the 10-15 mode driving test method shown in FIG. 10, there are not only acceleration intervals, but also many deceleration intervals during the driving of the automobile, and effective recovery of electric energy in these deceleration intervals leads to the suppression of the total energy consumption of EVs or HEVs.

When such a rapid discharge or rapid charge is performed, a large current flows into the battery, so that the internal resistance of the battery greatly affects the battery properties. Particularly with respect to a battery used for EVs or HEVs, to obtain satisfactory output properties and regeneration properties it is required that even when the state of charge is changed, the internal resistance is low and constant. As the internal resistance by a change in the state of charge, an IV resistance value obtained by measuring a voltage when the battery is charged or discharged at several current values during some period of time and by calculating an inclination of the voltage relative to the current value, is adopted. This IV resistance value is an index for learning how much current can be flowed into the battery.

As a positive electrode active material in a nonaqueous electrolyte secondary battery, as described above, $LiCoO_2$, $LiNiO_2$, $LiNi_yCO_{1-y}O_2$ (y=0.01 to 0.99), $LiMnO_2$, $LiMn_2O_4$, $LiCo_xMn_yNi_zO_2$ (x+y+z=1) or $LiFePO_4$ is used individually or in combination. Among them, $LiCoO_2$ and $LiMn_2O_4$ have a high electrode potential and high efficiency, so that from them, a battery having a high voltage and a high energy density can be obtained; however, the obtained battery has such properties as being excellent in output properties, but being poor in regeneration output properties.

Therefore, as a positive electrode active material in a nonaqueous electrolyte secondary battery as a battery for EVs or HEVs, taking into consideration the above-noted properties of a positive electrode active material, $Li_{1+a}Ni_xCo_yM_zO_2$ (wherein M is at least one element selected from Mn, Al, Ti, Zr, Nb, B, Mg and Mo; and $0 \leq a \leq 0.3$, $0.1 \leq x \leq 1$, $0 \leq y \leq 0.5$, $0 \leq z \leq 0.9$, a+x+y+z=1) is preferably used. With respect to the discharge curve of a nonaqueous electrolyte secondary battery using such a positive electrode active material, when compared to a nonaqueous electrolyte secondary battery using a positive electrode active material having high initial efficiency, such as $LiCoO_2$ and $LiMn_2O_4$, the internal resistance in the final stage of discharge becomes gradually higher, so that there is such a tendency that the output voltage is relatively moderately lowered.

As a negative electrode active material, generally, a carbon material having high initial efficiency, such as graphite is used. However, when such a carbon material is used as a negative electrode active material and the above-noted $Li_{1+a}Ni_xCo_yM_zO_2$ having low initial efficiency is used as a positive electrode active material, an irreversible capacity of the negative electrode relative to that of the positive electrode becomes small and so long as a ratio of the amount of the negative electrode active material/the amount of the positive electrode active material is not enlarged, a region in which the internal resistance of the positive electrode is high is used in the final stage of discharge, so that a disadvantage is caused wherein the IV resistance becomes high at a low state of charge. On the other hand, even when the ratio of the amount of the negative electrode active material/the amount of the positive electrode active material is enlarged so as to restrain the IV resistance from becoming high at a low state of charge, a disadvantage is also caused wherein the negative electrode active material mixture layer becomes too thick and the output properties are lowered.

The present inventors have made extensive and intensive studies toward suppressing an increase in the IV resistance at a low state of charge in a nonaqueous electrolyte secondary battery like one mentioned above. As a result, it has been found that when the initial efficiency of the negative electrode active material is lowered by blending a powder of a compound having an imide bond which has a large irreversible capacity relative to the negative electrode active material to a carbon material as the negative electrode active material, an increase in the IV resistance value in a low state of charge region can be restrained and further, when a nonaqueous electrolyte secondary battery is so designed that the ratio of battery discharge capacity/positive electrode discharge capacity is 0.9 or less, it is unnecessary to use a region in which the internal resistance of the positive electrode active material in the final stage of discharge becomes high, so that at from a low state of charge to a high state of charge, the IV resistance value can be maintained at a low constant value. Therefore, a nonaqueous electrolyte secondary battery having preferable properties as a battery for EVs or HEVs can be obtained. Based on this novel finding, the present invention has been completed.

JP-A-6-163031 discloses that in a nonaqueous electrolyte secondary battery including a negative electrode produced by unifying a carbon powder as a negative electrode active material with a binder, a polyimide resin is used as the binder and the negative electrode is produced using a slurry in which a carbon powder is blended to a solution prepared by dissolving polyimide in an organic solvent, such as N-methyl-2-pyrrolidone (NMP). However, in JP-A-6-163031, there is neither description with respect to an increase in the IV resistance value in a low state of charge region of the nonaqueous electrolyte secondary battery nor description indicating the incorporation of a polyimide resin in a powder form in the negative electrode.

JP-A-2000-182621 discloses that for the purpose of suppressing a reaction of an organic solvent with a negative electrode active material in a nonaqueous electrolyte secondary battery, an imide compound is incorporated in a negative electrode, and this negative electrode is produced by coating the imide compound dissolved in an organic solvent onto a negative electrode active material and by evaporating the organic solvent. However, in JP-A-2000-182621, there is neither description with respect to an increase in the IV resistance value in a low state of charge region of a nonaqueous electrolyte secondary battery nor description indicating the incorporation of an imide compound in a powder form in a negative electrode.

Further, JP-A-2000-195553 discloses that in a nonaqueous electrolyte secondary battery having a positive electrode including a composite oxide represented by Chemical Formula: $Li_xMn_yO_2$ (wherein $0.4 \leq x \leq 1.35$ and $0.6 \leq y \leq 1$) as an active material and a negative electrode including a carbon powder as an active material, for the purpose of preventing dissociation of manganese from the positive electrode to increase the cycle life at a high temperature, a polyimide resin is incorporated in the positive or negative electrode. However, there is no description with respect to the use of a lithium-transition metal compound represented by $Li_{1+a}Ni_xCo_yM_zO_2$ (wherein M is at least one element selected from Mn, Al, Ti, Zr, Nb, B, Mg and Mo; and $0 \leq a \leq 0.3$, $0.1 \leq x \leq 1$, $0 \leq y \leq 0.5$, $0 \leq z \leq 0.9$, $a+x+y+z=1$) as a positive electrode active material and with respect to an increase in the IV resistance value in a low state of charge region of a nonaqueous electrolyte secondary battery.

SUMMARY

Therefore, an advantage of some aspects of the present invention is to provide a nonaqueous electrolyte secondary battery suitable for an EV or an HEV, for example, which is excellent in load properties and regeneration properties and in which a change in the IV resistance value at a low state of charge is suppressed.

A nonaqueous electrolyte secondary battery according to a first aspect of the present invention includes a lithium-transition metal compound as a positive electrode active material that is capable of intercalating and deintercalating a lithium ion and is represented by $Li_{1+a}Ni_xCo_yM_zO_2$ (wherein M is at least one element selected from Mn, Al, Ti, Zr, Nb, B, Mg and Mo; and $0 \leq a \leq 0.3$, $0.1 \leq x \leq 1$, $0 \leq y \leq 0.5$, $0 \leq z \leq 0.9$, $a+x+y+z=1$), and carbon as a negative electrode active material that is capable of intercalating and deintercalating a lithium ion and is added with a powder of a compound having an imide bond.

Examples of the compound having an imide bond (see the following structural formula) include polyimide, polyamide-imide, polyetherimide, polyesterimide, polyethyleneimide, polypropyleneimide, polyurethaneimide and polymethacrylimide, and these compounds can be used individually or in an appropriate combination of two or more types thereof.

[Chemical Formula 1]

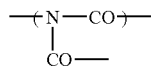

Examples of the nonaqueous solvent (organic solvent) constituting the nonaqueous solvent electrolyte according to the present aspect of the present invention include carbonates, lactones, ethers and esters which are used generally in a nonaqueous electrolyte secondary battery, and these solvents can be used in combination of two or more types thereof. Among them, carbonates, lactones, ethers and esters are preferred and carbonates are more preferred.

Specific examples of the above nonaqueous solvent include ethylene carbonate (EC), propylene carbonate, butylene carbonate, fluoroethylene carbonate (FEC), 1,2-cyclohexyl carbonate (CHC), cyclopentanone, sulfolane, 3-methylsulfolane, 2,4-dimethylsulfolane, 3-methyl-1,3oxasolizine-2-one, dimethyl carbonate (DMC), methyl ethyl carbonate (MEC), diethyl carbonate (DEC), methyl propyl carbonate, methyl butyl carbonate, ethyl propyl carbonate, ethyl butyl carbonate, dipropyl carbonate, γ-butyrolactone, γ-valerolactone, 1,2-dimethoxyethane, tetrahydrofuran, 2-methyl tetrahydrofuran, 1,3-dioxolane, methyl acetate, ethyl acetate and 1,4-dioxane.

In the present invention, in terms of enhancing a charge and discharge efficiency, a solvent mixture of EC and a chain carbonate, such as DMC, MEC and DEC is preferably used and an asymmetric chain carbonate, such as MEC is preferred. Further, an unsaturated cyclic carbonate ester, such as vinylene carbonate (VC) can be incorporated in the nonaqueous electrolyte.

As a solute of the nonaqueous electrolyte according to the present aspect of the present invention, a lithium salt used generally as a solute in a nonaqueous electrolyte secondary battery can be used. Examples of the lithium salt include $LiPF_6$, $LiBF_4$, $LiCF_3SO_3$, $LiN(CF_3SO_2)_2$, $LiN(C_2F_5SO_2)_2$, $LiN(CF_3SO_2(CO_4F_9SO_2)$, $LiC(CF_3SO_2)_3$, $LiC(C_2F_5SO_2)_3$, $LiAsF_6$, $LiClO_4$, $LiB_{10}C_{10}$, $Li_2B_{12}Cl_{12}$, $LiB(C_2O_4)_2$, $LiB(C_2O_4)F_2$, $LiP(C_2O_4)_3$, $LiP(C_2O_4)_2F_2$, $LiP(C_2O_4)F_4$ and a mixture thereof. Among them, $LiPF_6$ (hexafluoro lithium phosphate) is preferably used. The amount of a solute dissolved in the nonaqueous solvent is preferably 0.5 to 2.0 mol/L.

Further, in the above nonaqueous electrolyte secondary battery, a ratio of battery discharge capacity/positive electrode discharge capacity may be 0.9 or less.

Further, in the above nonaqueous electrolyte secondary battery, the compound having an imide bond may be polyimide.

Further, in the above nonaqueous electrolyte secondary battery, the polyimide may be a compound represented by the following Chemical Formula (I) or (II):

[Chemical Formula 2]

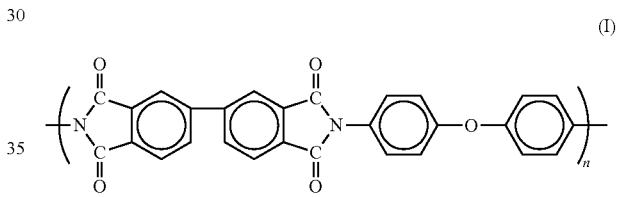

[Chemical Formula 3]

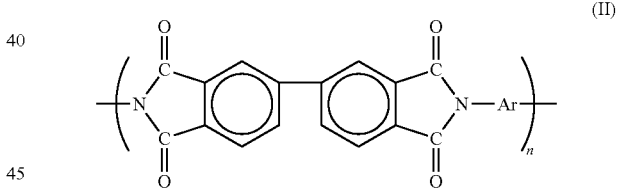

wherein Ar represents an aryl group.

Further, in the above nonaqueous electrolyte secondary battery, an average particle diameter of the polyimide powder may be 0.1 to 15 μm. When the average particle diameter is less than 0.1 μm, handling of the powder becomes difficult during the preparation of an electrode plate. On the other hand, when the average particle diameter is more than 15 μm, the diffusion of the lithium ion into the inside of the polyimide powder takes much time.

Further, in the above nonaqueous electrolyte secondary battery, the positive electrode active material may be $Li_{1+a}Ni_xCo_yMn_zO_2$ ($0 \leq a \leq 0.15$, $0.25 \leq x \leq 0.45$, $0.25 \leq y \leq 0.35$, $0.25 \leq z \leq 0.35$, $a+x+y+z=1$).

Further, in the above nonaqueous electrolyte secondary battery, the negative electrode active material may be graphite.

Further, in the above nonaqueous electrolyte secondary battery, the negative electrode may be produced from a mixture slurry in an aqueous solvent.

Since the present invention has the above constitution, excellent advantages described as follows can be exhibited. Since the nonaqueous electrolyte secondary battery according to the present aspect of the present invention uses as a positive electrode active material, a lithium-transition metal compound represented by $Li_{1+a}Ni_xCO_yM_zO_2$ (wherein M is at least one element selected from n, Al, Ti, Zr, Nb, B, Mg and Mo; and $0 \leq a \leq 0.3$, $0.1 \leq x \leq 1$, $0 \leq y \leq 0.5$, $0 \leq z \leq 0.9$, $a+x+y+z=1$) having a lower initial efficiency than that of $LiCoO_2$ and $LiMn_2O_4$, and as a negative electrode active material, carbon to which a compound having an imide bond is added, not only the irreversible capacity of the negative electrode is large and a high resistance region of the positive electrode in the final stage of discharge is not used, but also the coating thickness of the negative electrode can be designed to be small, so that a nonaqueous electrolyte secondary battery having a small IV resistance value even at a low state of charge can be obtained. Therefore, by the nonaqueous electrolyte secondary battery according to the present aspect of the present invention, compared to a nonaqueous electrolyte secondary battery using a positive electrode active material having a high voltage, such as $LiCoO_2$ and $LiMn_2O_4$, regeneration properties are satisfactory and the IV resistance value is small in all the used charge and discharge range, so that a nonaqueous electrolyte secondary battery suitable for EVs and HEVs can be obtained.

Further, since the nonaqueous electrolyte secondary battery according to the present aspect of the present invention may have a ratio of battery discharge capacity/positive electrode discharge capacity $\leq 0.9$, it is unnecessary to use a final stage part of a discharge curve in which particularly the internal resistance of the positive electrode active material becomes high, so that the above advantage of the present invention is remarkably exhibited.

Further, according to the nonaqueous electrolyte secondary battery in the present aspect of the present invention, since polyimide may have a larger irreversible capacity particularly for the intercalation and deintercalation of a lithium ion than that of a carbon material, the initial efficiency of the negative electrode can be effectively lowered, so that the above advantage of the present invention is remarkably exhibited. By using as the polyimide, polyimides represented by the following

[Chemical Formula 4]

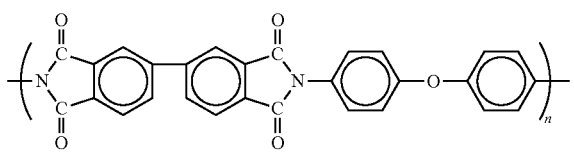
(I)

[Chemical Formula 5]

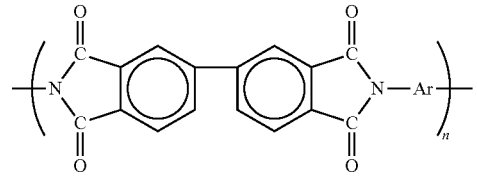
(II)

wherein Ar represents an aryl group, particularly the above advantage of the present invention is remarkably exhibited.

Further, according to the nonaqueous electrolyte secondary battery in the present aspect of the present invention, since the polyimide may be used in a powder form, in the slurry preparation process, not only an organic solvent but also an aqueous solvent can be used as the solvent and moreover, irrespective of the solvent type, a certain amount of the polyimide can be incorporated in the slurry, so that a nonaqueous electrolyte secondary battery having good homogeneity of the performance thereof while exhibiting the above advantage of the present invention, can be obtained.

According to the nonaqueous electrolyte secondary battery in the present aspect of the present invention, when as a positive electrode active material, $Li_{1+a}Ni_xCO_yM_zO_2$ (wherein M is at least one element selected from Mn, Al, Ti, Zr, Nb, B, Mg and Mo; and $0 \leq a \leq 0.3$, $0.1 \leq x \leq 1$, $0 \leq y \leq 0.5$, $0 \leq z \leq 0.9$, $a+x+y+z=1$) is used, in the final stage of discharge, the internal resistance is not rapidly elevated and the output voltage of the battery in that stage is not rapidly lowered, so that the above advantage of the present invention is satisfactorily exhibited. Particularly as a positive electrode active material, $Li_{1+a}Ni_xCo_yMn_zO_2$ ($0 \leq a \leq 0.15$, $0.25 \leq x \leq 0.45$, $0.25 \leq y \leq 0.35$, $0.25 \leq z \leq 0.35$, $a+x+y+z=1$) is preferably used, since the above advantage of the present invention is remarkably exhibited and the battery properties are extremely advantageous.

Further, according to the nonaqueous electrolyte secondary battery in the present aspect of the present invention, since graphite may be used as a negative electrode active material having an extremely high initial efficiency and used for general purpose. By incorporating a compound having an imide bond in such a negative electrode active material, the initial efficiency can be largely lowered, so that a nonaqueous electrolyte secondary battery in which the above advantage of the present invention is particularly satisfactorily exhibited can be obtained.

Further, according to the nonaqueous electrolyte secondary battery in the present aspect of the present invention, particularly when an aqueous solvent is used as the solvent for the preparation of the slurry, waste liquid treatment becomes easier compared to the case where an organic solvent is used, so that the production process can be simplified.

BRIEF DESCRIPTION OF THE DRAWINGS

The invention will be described with reference to the accompanying drawings, wherein like numerals reference like elements.

DESCRIPTION OF EXEMPLARY EMBODIMENTS

Figure 1:
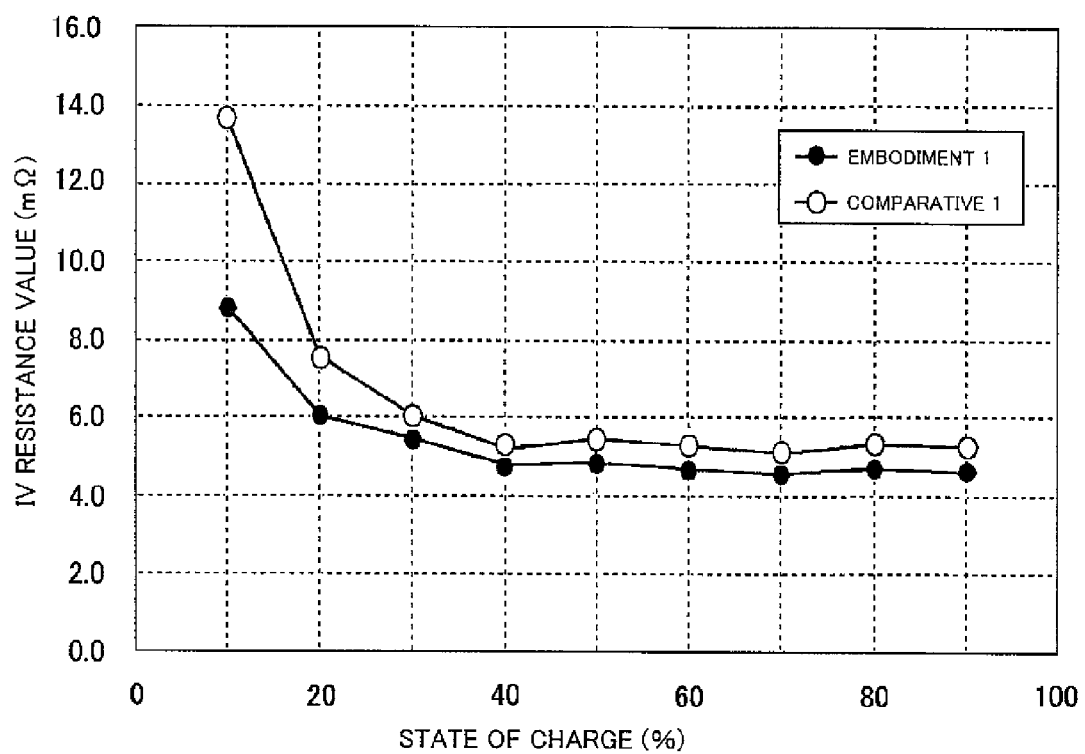
FIG. 1 is a view showing the relationship between the state of charge and measured values of the IV resistance in nonaqueous electrolyte secondary batteries of Embodiment 1 and Comparative 1.

Hereinafter, exemplary embodiments for carrying out the present invention are described in detail referring to various embodiments and comparative examples. However, the following embodiments show only examples of the nonaqueous electrolyte secondary battery for embodying the technical concept of the present invention and it is not intended that the present invention is limited to these embodiments. The present invention can be equally applied also to those modified variously without departing from the technical concept shown in the claims appended hereto.

Embodiment 1, Comparative 1

First, a specific production method of a nonaqueous electrolyte secondary battery commonly used in Embodiment 1 and Comparative 1 and a measuring method of the IV resistance are described.

Preparation of Positive Electrode Plate $LiCO_3$ and $(Ni_{0.4}Co_{0.3}Mn_{0.8})_3O_4$ were mixed so that the mol ratio of $Li:(Ni_{0.4}Co_{0.3}Mn_{0.8})$ becomes 1:1. Next, this mixture was baked at 900° C. in an air atmosphere for 20 hours and a lithium-transition metal composite oxide represented by $LiNi_{0.4}Co_{0.3}Mn_{0.3}O_2$ having an average particle diameter of 12.1 μm was obtained as a positive electrode active material. The thus-obtained positive electrode active material, carbon as a conductive agent and polyfluorovinylidene (PVdF) as a binder were added to NMP so that the mass ratio thereof becomes 92:5:3 and kneaded, to thereby prepare a mixture slurry of the positive electrode active material. The thus-prepared positive electrode active material mixture slurry was coated onto an aluminum foil as a positive electrode substrate and was dried to form a positive electrode active material mixture layer. Thereafter, the positive electrode active material mixture layer was rolled using a roller to have a predetermined packing density and was cut into a predetermined size, to thereby prepare a positive electrode plate.

Preparation of Negative Electrode Plate

An aqueous solution in which graphite as a negative electrode active material and a carboxy methyl cellulose (CMC) as a binder were dissolved, and a polyimide powder represented by the following Chemical Formula (I):

[Chemical Formula 6]

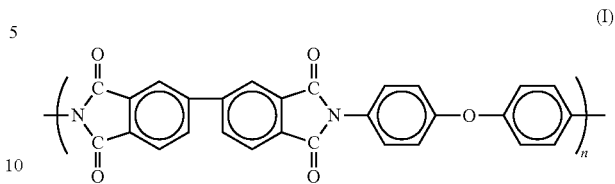

(I)

and having an average particle diameter of 6.9 μm were kneaded to prepare a negative electrode active material mixture slurry.

At that time, these compounds were kneaded so that the mass ratio of Negative electrode active material:CMC:Polyimide becomes 95.6:3.0:1.4. Next, the thus-prepared negative electrode active material mixture slurry was coated onto a copper foil as a negative electrode substrate and was dried to form a negative electrode active material mixture layer. Thereafter, the negative electrode active material mixture layer was rolled using a roller to have a predetermined packing density, to thereby prepare the negative electrode plate of Embodiment 1. The negative electrode plate of Comparative 1 was prepared without Incorporating a polyimide powder and so that the mass ratio of Negative electrode active material:Binder becomes 97:3.

Preparation of Nonaqueous Electrolytic Solution

In the preparation of a nonaqueous electrolytic solution, in a solvent mixture prepared by mixing EC (a cyclic carbonate) and EMC (a chain carbonate) in a volume ratio of 3:7, hexafluoro lithium phosphate ($LiPF_6$) as an electrolyte was dissolved in a ratio of 1 mol/liter. To the thus-obtained solution, only 1% by mass of vinylene carbonate (VC) was added to prepare the nonaqueous electrolytic solution.

Production of Nonaqueous Electrolyte Secondary Battery

Next, the positive electrode plate prepared as described above and the negative electrode plates of Embodiment 1 and Comparative 1 respectively prepared as described above were deposited with a separator including a microporous film made of polyethylene interposed therebetween, and the resultant multilayered body was wound in a swirl form to prepare spiral electrodes. In the positive electrode plate and negative electrode plate, non-coated parts are formed and these non-coated parts form substrate edge parts protruding from the end of the separator of the spiral electrodes. After to both ends of the spiral electrodes, respectively a current collector plate was attached by laser welding, the spiral electrodes were inserted into a metal-made outer can and the tip of a lead part protruding from an end of the current collector plate was connected to an electrode terminal mechanism.

Figure 5:
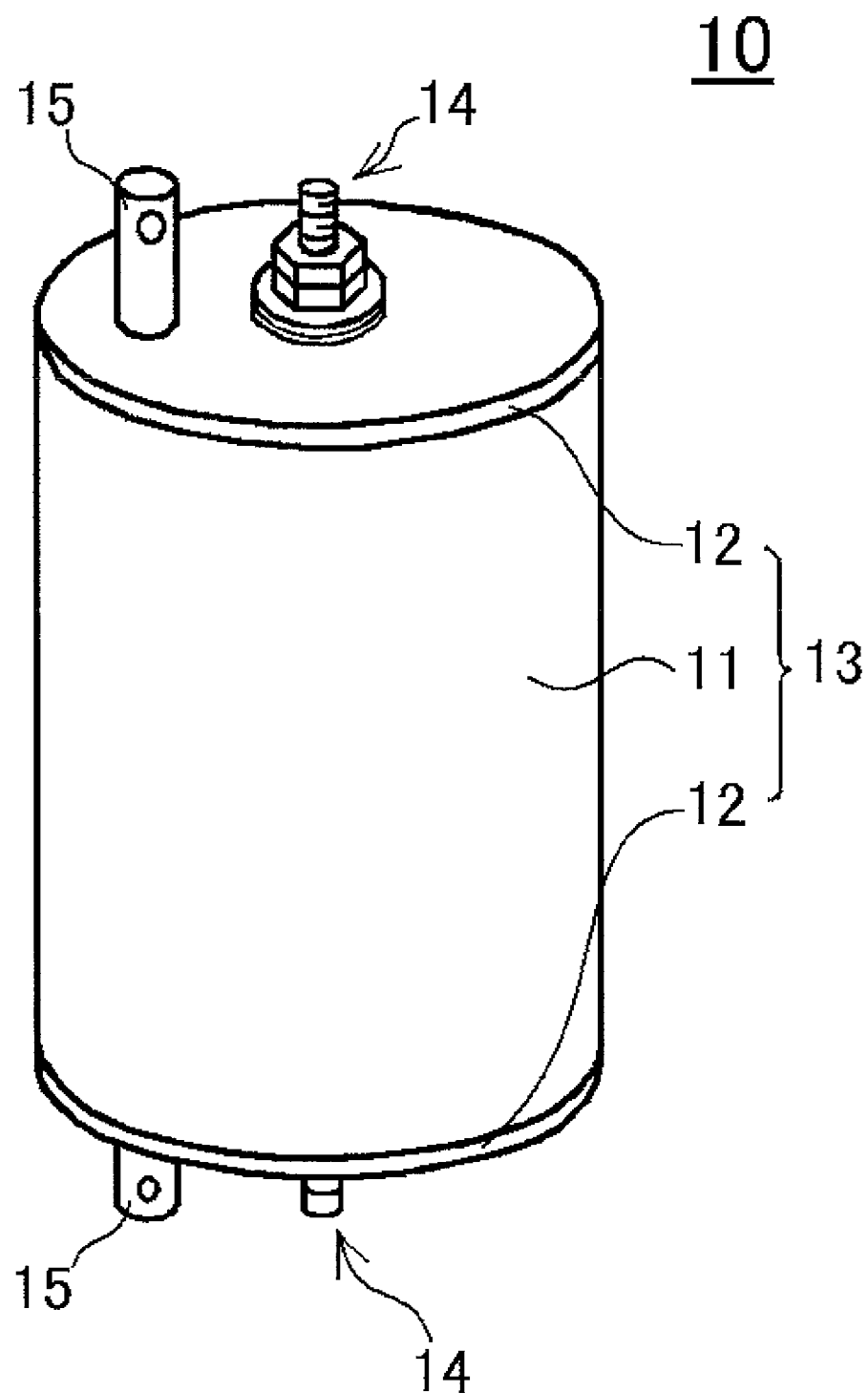
FIG. 5 is a perspective view showing a cylindrical nonaqueous electrolyte secondary battery.
Figure 6:
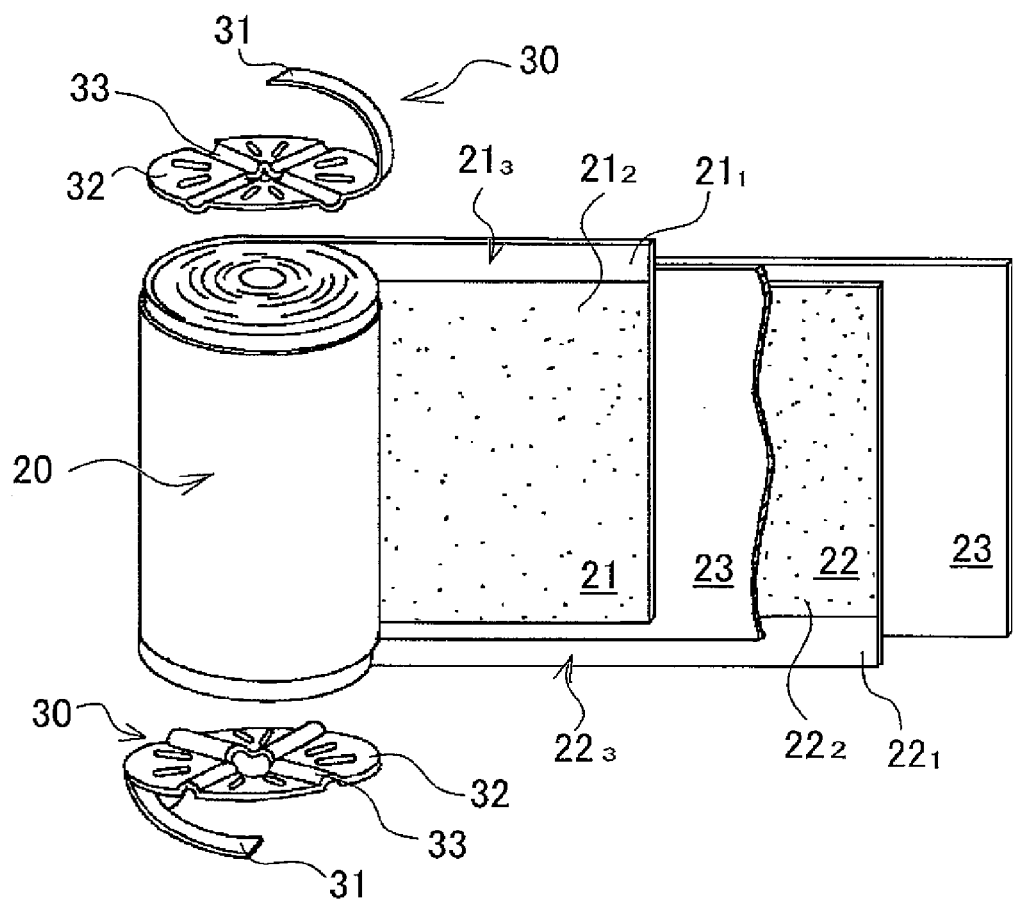
FIG. 6 is an exploded perspective view showing a wound electrode body in the cylindrical nonaqueous electrolyte secondary battery.
Figure 7:
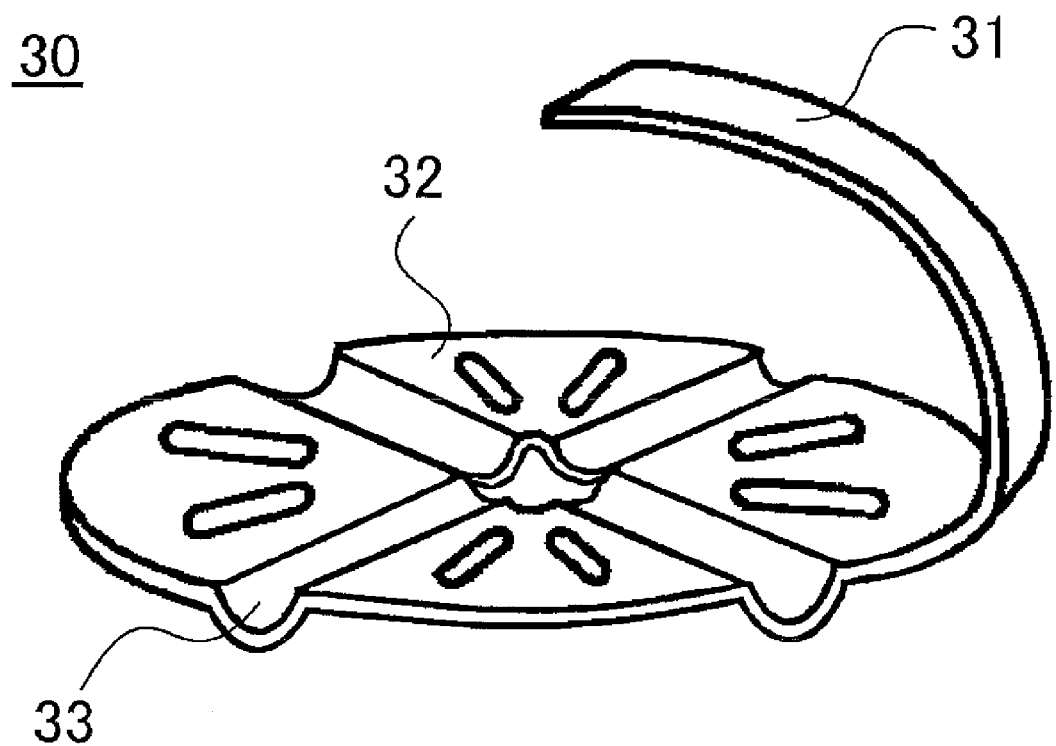
FIG. 7 is a perspective view showing a current collector plate used in the cylindrical nonaqueous electrolyte secondary battery.
Figure 8:
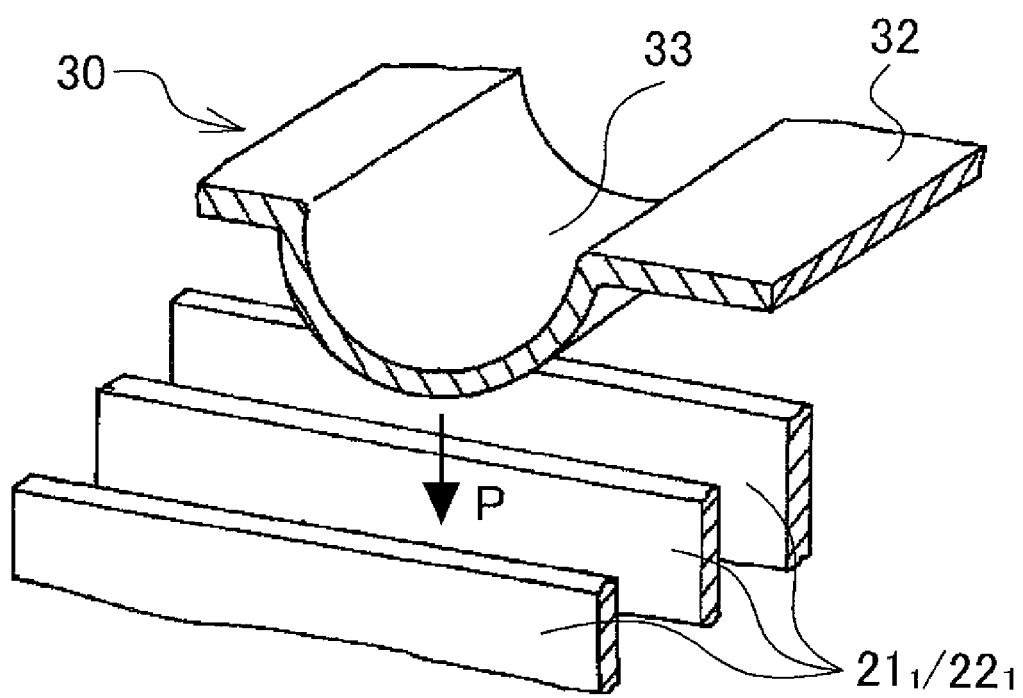
FIG. 8 is a partially broken perspective view showing the state before the current collector plate is pressed against the wound electrode body.
Figure 9:
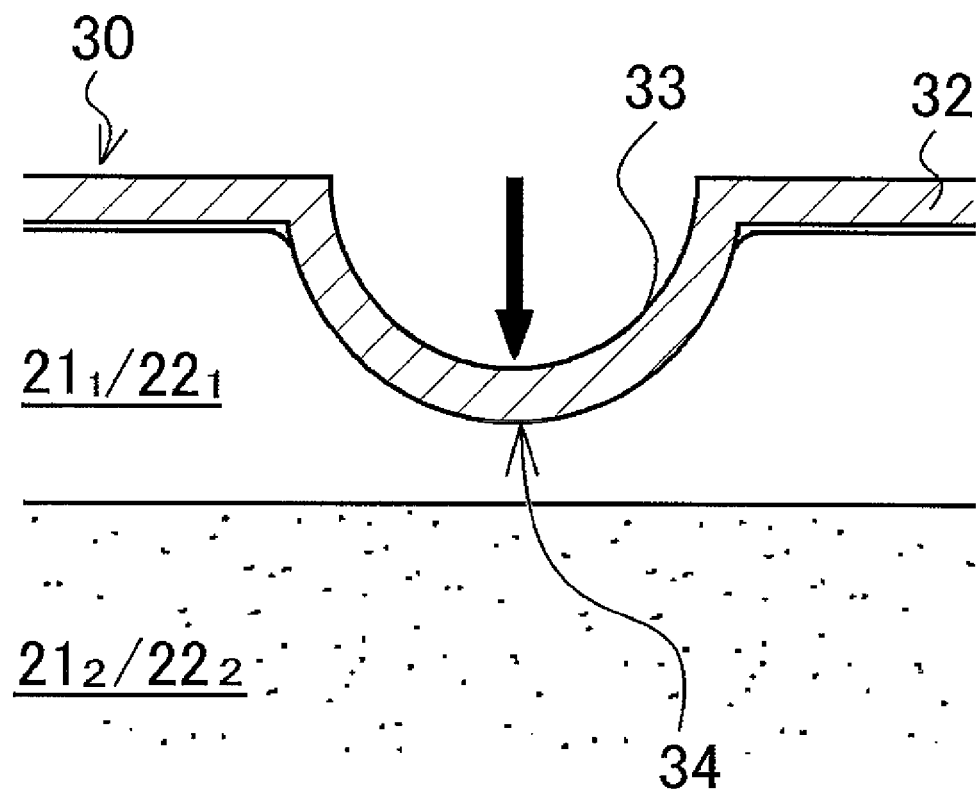
FIG. 9 is a partially broken front view showing the state in which the current collector plate is pressed against the wound electrode body and a laser beam is irradiated to the power collection plate.
Figure 10:
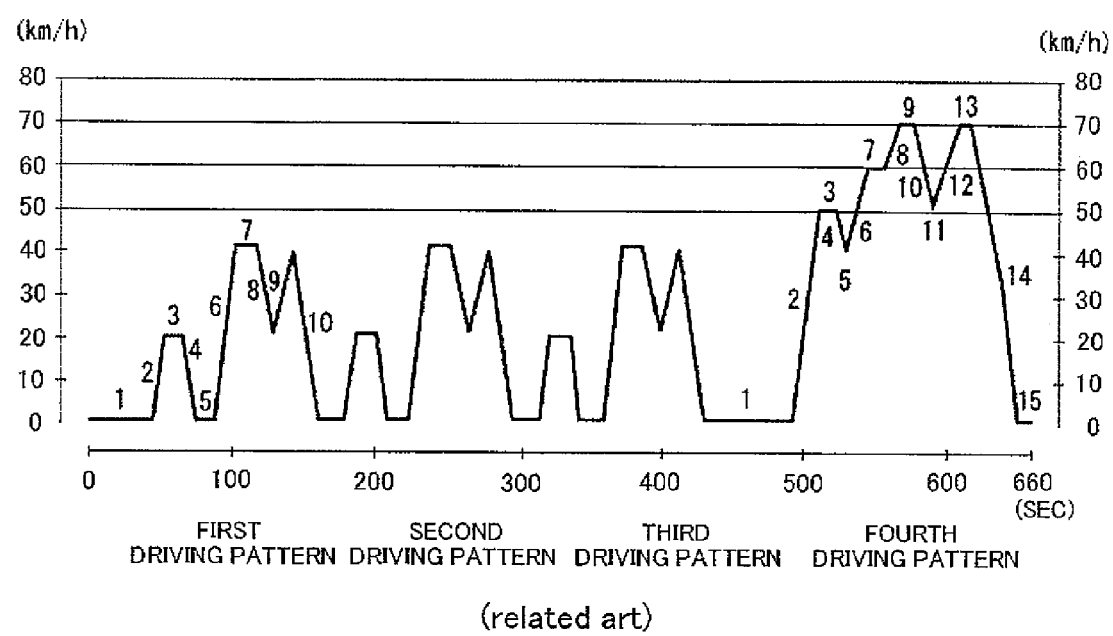
FIG. 10 is a view showing a driving pattern of the 10-15 mode driving test method.

Next, the nonaqueous electrolytic solution prepared as described above was injected into the metal-made outer can. Thereafter, by sealing the outer can, a nonaqueous electrolyte secondary battery having the same shape as that of a related-art battery shown in FIG. 5 was produced. In the nonaqueous electrolyte secondary battery of Embodiment 1, a designed capacity was 5.4 Ah and the ratio of battery discharge capacity/positive electrode discharge capacity was 0.89. In the nonaqueous electrolyte secondary battery of Comparative 1, a designed capacity was 5.3 Ah and the ratio of battery discharge capacity/positive electrode discharge capacity was 0.94.

Measuring Method of the Ratio of Battery Discharge Capacity/Positive Electrode Discharge Capacity The battery discharge capacity was measured by performing a constant current-constant voltage charge (at 1 It and 4.1 V) for 2 hours and a constant current-constant voltage discharge (at ⅓ It and 3.0 V) for 5 hours at a room temperature of 25° C. The positive electrode discharge capacity was measured by a method including: cutting out an original positive electrode plate of the battery to prepare a sample positive electrode plate having a coated area 12.5 cm²; using metal lithium as a counter and reference electrode to prepare a three-electrode cell; measuring a positive electrode discharge capacity of the sample positive electrode plate by performing a constant current-constant voltage charge (at 1 It and 4.2 V (v.s. Li/Li⁺)) for 2 hours and a constant current discharge (at ⅓ It and 3.0 V (v.s. Li/Li⁺)) at a room temperature of 25° C.; and calculating the positive electrode discharge capacity of the original positive electrode plate using a ratio between the area of the original positive electrode plate and the area of the sample positive electrode plate. The ratio of battery discharge capacity/positive electrode discharge capacity was calculated by dividing the above-obtained battery discharge capacity by the above-obtained positive electrode discharge capacity.

IV Resistance Measuring Method

Batteries were charged until each state of charge at a charging current of 1 It at a room temperature of 25° C., and then discharged at currents of 20 A, 40 A, 60 A and 80 A respectively for 10 seconds, whereby each battery voltage was measured. By plotting current values relative to each battery voltages, I-V properties during the discharge were obtained and from the inclination of the thus-obtained line, the IV resistance (mΩ) during the discharge was obtained. Thus, the IV resistance value at a predetermined state of charge was obtained. A state of charge which had deviated by the discharge was restored to the original state of charge by charging the battery at a constant current of 5 A. The relationship between the state of charge and measured values of the IV resistance is shown in FIG. 1.

The result shown in FIG. 1 revealed the following features. At a state of charge of 40% or more, the IV resistance value of the nonaqueous electrolyte secondary battery of Embodiment 1 is slightly smaller than that of the nonaqueous electrolyte secondary battery of Comparative 1; however, even when both the states of charge of the nonaqueous electrolyte secondary batteries of Embodiment 1 and Comparative 1 are substantially changed, the IV resistance values of these nonaqueous electrolyte secondary batteries are substantially the same as each other. On the other hand, at a state of charge of less than 40%, with respect to the nonaqueous electrolyte secondary battery of Comparative 1 in which polyimide is not incorporated in the negative electrode active material, even when the positive electrode active material thereof has the same composition as that of the nonaqueous electrolyte secondary battery of Embodiment 1, the IV resistance value is rapidly increased according to its decreasing state of charge.

In contrast, with respect to the nonaqueous electrolyte secondary battery of Embodiment 1 in which polyimide is incorporated in the negative electrode active material, even at a state of charge of less than 40%, until at a state of charge of down to 20%, an increase in the IV resistance value is slight, and at a state of charge of less than 20%, the IV resistance value is rapidly increased. Having said that, even at a state of charge of 10%, the IV resistance value of the nonaqueous electrolyte secondary battery of Embodiment 1 is only about ⅔ of the corresponding value of the nonaqueous electrolyte secondary battery of Comparative 1.

Therefore, with respect to the nonaqueous electrolyte secondary battery of Embodiment 1, it is apparent that so long as the ratio of battery discharge capacity/positive electrode discharge capacity is 0.9 or less, even when the state of charge becomes around 10 to 20%, the IV resistance value does not become very large. In contrast, when the ratio of battery discharge capacity/positive electrode discharge capacity is more than 0.9, at a state of charge of 20% or less, a region in which the internal resistance of the positive electrode active material in the final stage of discharge becomes high, is used, so that the IV resistance value becomes large like the nonaqueous electrolyte secondary battery of Comparative 1. Moreover, in the nonaqueous electrolyte secondary battery of Embodiment 1, the IV resistance value is maintained low and constant over a wide range of the state of charge compared to the nonaqueous electrolyte secondary battery of Comparative 1. The nonaqueous electrolyte secondary battery of Embodiment 1 is therefore suitable as a battery for EVs or HEVs for which particularly satisfactory output properties and satisfactory regeneration properties are required.

Embodiment 2, Comparative 2

The nonaqueous electrolyte secondary batteries of Embodiment 2 and Comparative 2 were produced as follows.

Preparation of Positive Electrode Plate $Li_2CO_3$ and $(Ni_{0.75}Co_{0.15}Al_{0.1})_3O_4$ were mixed so that the mol ratio of Li:$(Ni_{0.75}Co_{0.15}Al_{0.1})$ becomes 1:1. Next, this mixture was baked at 750° C. in an air atmosphere for 20 hours and a lithium-transition metal composite oxide represented by $LiNi_{0.75}Co_{0.15}Al_{0.1}O_2$ having an average particle diameter of 9.9 μm was obtained as the positive electrode active material. The thus-obtained positive electrode active material, carbon as a conductive agent and a PVdF as a binder were added to NMP so that the mass ratio thereof becomes 88:9:3 and kneaded, to thereby prepare a slurry of the positive electrode active material. The thus-prepared positive electrode active material mixture slurry was coated onto an aluminum foil as the positive electrode substrate and was dried to form a positive electrode active material mixture layer. Thereafter, the positive electrode active material mixture layer was rolled using a roller to have a predetermined packing density and was cut into a predetermined size, to thereby prepare a positive electrode plate.

Preparation of Negative Electrode Plate

An aqueous solution in which graphite as a negative electrode active material and a CMC as a binder were dissolved, a styrene-butadiene rubber latex (SBR) and a polyimide powder represented by the following Chemical Formula (I):

[Chemical Formula 7]

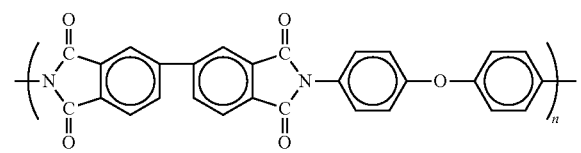

(I)

and having an average particle diameter of 6.9 μm were kneaded to prepare a negative electrode active material mixture slurry.

At that time, these compounds were kneaded so that the mass ratio of Negative electrode active material:CMC:SBR:

Polyimide becomes 96.0:1.0:1.0:2.0. Next, the thus-prepared negative electrode active material mixture slurry was coated onto a copper foil as the negative electrode substrate and was dried to form a negative electrode active material mixture layer. Thereafter, the negative electrode active material mixture layer was rolled using a roller to have a predetermined packing density, to thereby prepare the negative electrode plate of Embodiment 2. The negative electrode plate of Comparative 2 was prepared without incorporating a polyimide powder and so that the mass ratio of Negative electrode active material:CMC:SBR becomes 98.0:1.0:1.0.

Preparation of Nonaqueous Electrolytic Solution

In the preparation of the nonaqueous electrolytic solution, in a solvent mixture prepared by mixing EC (a cyclic carbonate) and EMC (a chain carbonate) in a volume ratio of 3:7, hexafluoro lithium phosphate ($LiPF_6$) as an electrolyte was dissolved in a ratio of 1 mol/liter. To the thus-obtained solution, only 1% by mass of vinylene carbonate (VC) was added to prepare the nonaqueous electrolytic solution.

Production of Nonaqueous Electrolyte Secondary Battery

Next, using the positive electrode plate prepared as described above and the negative electrode plates of Embodiment 2 and Comparative 2 respectively prepared as described above, in substantially the same manner as that for the batteries of Embodiment 1 and Comparative 1, the nonaqueous electrolyte secondary batteries of Embodiment 2 and Comparative 2 were produced. In the nonaqueous electrolyte secondary battery of Embodiment 2, a designed capacity was 5.7 Ah and the ratio of battery discharge capacity/positive electrode discharge capacity was 0.88 and in the nonaqueous electrolyte secondary battery of Comparative 2, a designed capacity was 5.7 Ah and the ratio of battery discharge capacity/positive electrode discharge capacity was 0.97.

IV Resistance Measuring Method

By using batteries of Embodiment 2 and Comparative 2, in substantially the same manner as in Embodiment 1 and Comparative 1, the IV resistance at a predetermined state of charge was measured. The relationship between the state of charge and measured values of the IV resistance in the batteries of Embodiment 2 and Comparative 2 is shown in FIG. 2.

Figure 2:
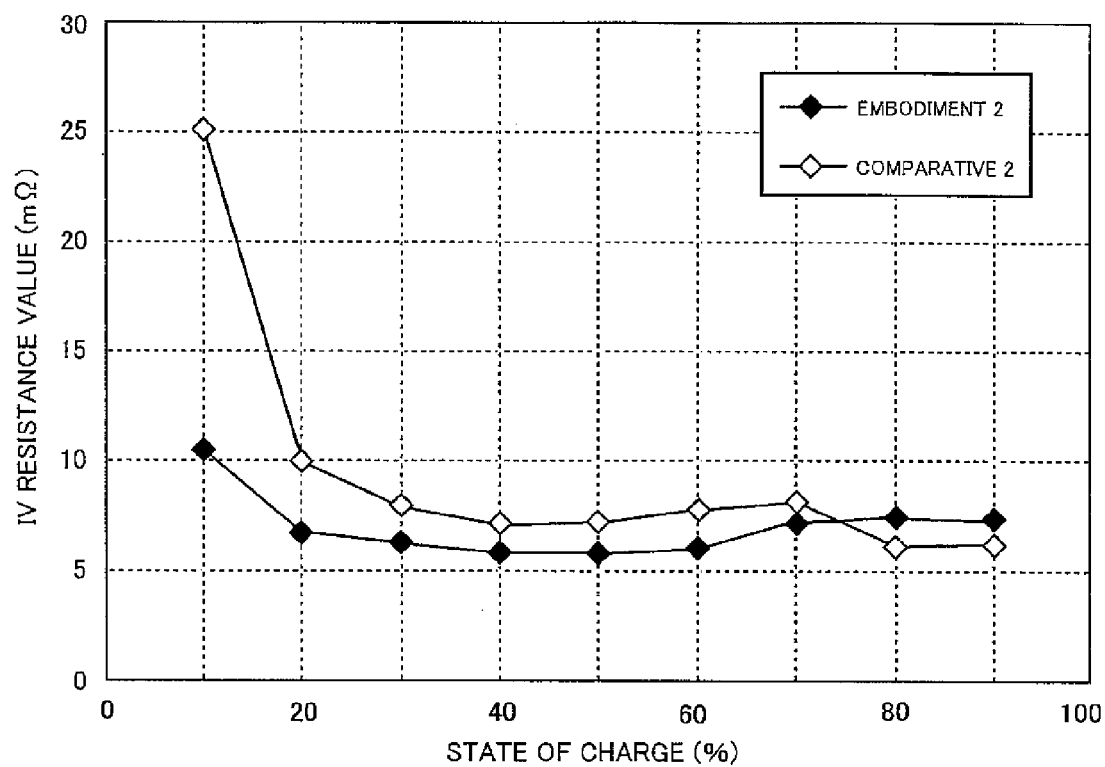
FIG. 2 is a view showing the relationship between the state of charge and measured values of the IV resistance in nonaqueous electrolyte secondary batteries of Embodiment 2 and Comparative 2.

The result shown in FIG. 2 revealed the following features. At a state of charge of 30% or more, the IV resistance value of the nonaqueous electrolyte secondary battery of Embodiment 2 is slightly smaller than that of the nonaqueous electrolyte secondary battery of Comparative 2; however, even when both the states of charge of the nonaqueous electrolyte secondary batteries of Embodiment 2 and Comparative 2 are substantially changed, the IV resistance values of these nonaqueous electrolyte secondary batteries are substantially the same as each other. On the other hand, at a state of charge of less than 30%, with respect to the nonaqueous electrolyte secondary battery of Comparative 2 in which polyimide is not incorporated in the negative electrode active material, even when the positive electrode active material thereof has the same composition as that of the nonaqueous electrolyte secondary battery of Embodiment 2, the IV resistance value is rapidly increased according its decreasing state of charge.

In contrast with respect to the nonaqueous electrolyte secondary battery of Embodiment 2 in which polyimide is incorporated in the negative electrode active material, even at a state of charge of less than 30%, until at a state of charge of down to 20%, an increase in the IV resistance value is slight, and at a state of charge of less than 20%, the IV resistance value is rapidly increased. Having said that, even at a state of charge of 10%, the IV resistance value of the nonaqueous electrolyte secondary battery of Embodiment 2 is only about ⅔ of the corresponding value of the nonaqueous electrolyte secondary battery of Comparative 2.

Therefore, with respect to the nonaqueous electrolyte secondary battery of Embodiment 2, it is apparent that so long as the ratio of battery discharge capacity/positive electrode discharge capacity is 0.9 or less, even when the state of charge becomes around 10 to 20%, the IV resistance value does not become very large. In contrast, when the ratio of battery discharge capacity/positive electrode discharge capacity is more than 0.9, at a state of charge of 20% or less, a region in which the internal resistance of the positive electrode active material in the final stage of discharge becomes high, is used, so that the IV resistance value becomes large like the nonaqueous electrolyte secondary battery of Comparative 2. Moreover, in the nonaqueous electrolyte secondary battery of Embodiment 2, the IV resistance value is maintained low and constant over a wide range of the state of charge compared to the nonaqueous electrolyte secondary battery of Comparative 2. The nonaqueous electrolyte secondary battery of Embodiment 2 is therefore suitable as a battery for EVs or HEVs for which particularly satisfactory output properties and satisfactory regeneration properties are required.

Embodiment 3, Comparative 3

The nonaqueous electrolyte secondary batteries of Embodiment 3 and Comparative 3 were produced as follows.

Preparation of Positive Electrode Plate $Li_2CO_3$ and $(Ni_{0.35}Co_{0.35}Mn_{0.30})_3O_4$ were mixed so that the mol ratio of $Li:(Ni_{0.35}Co_{0.35}Mn_{0.30})$ becomes 1:1. Next, this mixture was baked at 900° C. in an air atmosphere for 20 hours and a lithium-transition metal composite oxide represented by $LiNi_{0.35}Co_{0.35}Mn_{0.30}O_2$ having an average particle diameter of 11.4 µm was obtained as the positive electrode active material. The thus-obtained positive electrode active material, carbon as a conductive agent and a PVdF as a binder were added to NMP so that the mass ratio thereof becomes 88:9:3 and kneaded, to thereby prepare a slurry of the positive electrode active material. The thus-prepared positive electrode active material mixture slurry was coated onto an aluminum foil as the positive electrode substrate and was dried to form a positive electrode active material mixture layer. Thereafter, the positive electrode active material mixture layer was rolled using a roller to have a predetermined packing density and was cut into a predetermined size, to thereby prepare a positive electrode plate.

Production of Nonaqueous Electrolyte Secondary Battery

Using the same negative electrode plate and the same nonaqueous electrolytic solution as those in Embodiment 2 and Comparative 2, in substantially the same manner as that for the batteries of Embodiment 1 and Comparative 1, the nonaqueous electrolyte secondary batteries of Embodiment 3 and Comparative 3 were produced. In the obtained nonaqueous electrolyte secondary battery of Embodiment 3, a designed capacity was 5.5 Ah and the ratio of battery discharge capacity/positive electrode discharge capacity was 0.84 and in the nonaqueous electrolyte secondary battery of Comparative 3, a designed capacity was 5.6 Ah and the ratio of battery discharge capacity/positive electrode discharge capacity was 0.96.

IV Resistance Measuring Method

By using batteries of Embodiment 3 and Comparative 3, in substantially the same manner as in Embodiment 1 and Comparative 1, the IV resistance at a predetermined state of charge was measured. The relationship between the state of charge and measured values of the IV resistance in the batteries of Embodiment 3 and Comparative 3 is shown in FIG. 3.

Figure 3:
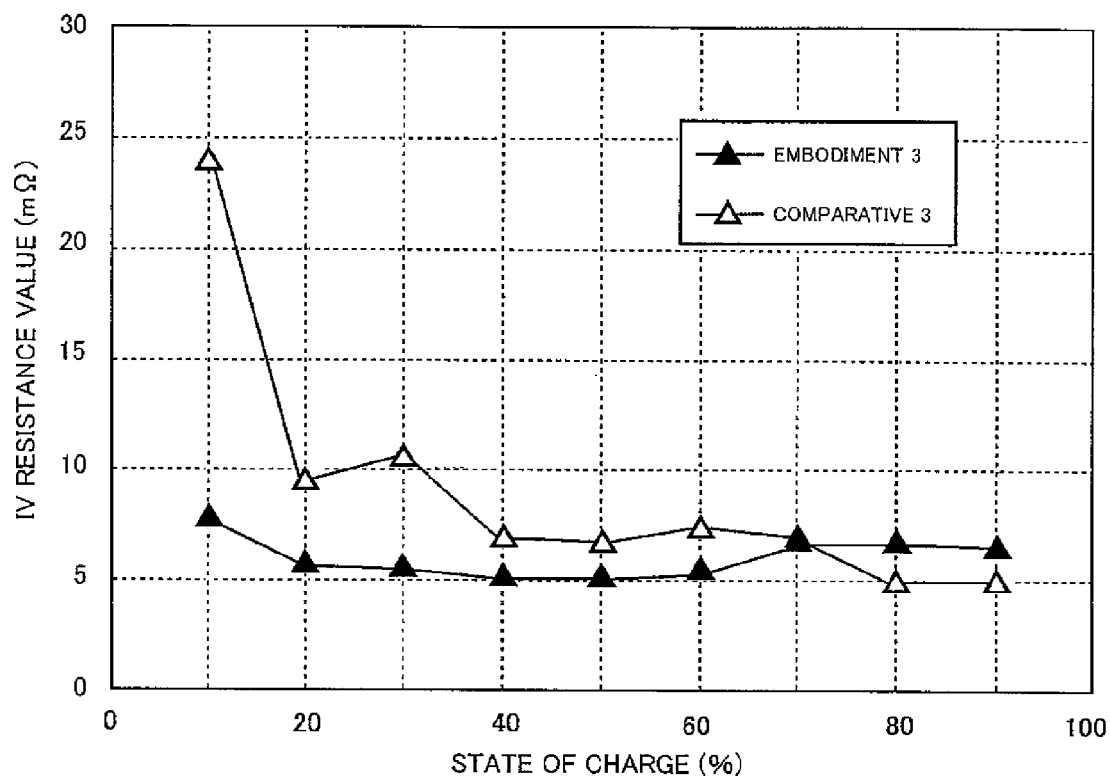
FIG. 3 is a view showing the relationship between the state of charge and measured values of the IV resistance in nonaqueous electrolyte secondary batteries of Embodiment 3 and Comparative 3.

The result shown in FIG. 3 revealed the following features. At a state of charge of 40% or more, the IV resistance value of the nonaqueous electrolyte secondary battery of Embodiment 3 is slightly smaller than that of the nonaqueous electrolyte secondary battery of Comparative 3; however, even when both the states of charge of the nonaqueous electrolyte secondary batteries of Embodiment 3 and Comparative 3 are substantially changed, the IV resistance values of these nonaqueous electrolyte secondary batteries are substantially the same as each other. On the other hand, at a state of charge of less than 40%, with respect to the nonaqueous electrolyte secondary battery of Comparative 3 in which polyimide is not incorporated in the negative electrode active material, even when the positive electrode active material thereof has the same composition as that of the nonaqueous electrolyte secondary battery of Embodiment 3, the IV resistance value is rapidly increased according to its decreasing state of charge.

In contrast, with respect to the nonaqueous electrolyte secondary battery of Embodiment 3 in which polyimide is incorporated in the negative electrode active material, even at a state of charge of less than 40%, until at a state of charge of down to 20%, an increase in the IV resistance value is slight, and at a state of charge of less than 20%, the IV resistance value is rapidly increased. Having said that, even at a state of charge of 10%, the IV resistance value of the nonaqueous electrolyte secondary battery of Embodiment 3 is only about ⅓ of the corresponding value of the nonaqueous electrolyte secondary battery of Comparative 3.

Therefore, with respect to the nonaqueous electrolyte secondary battery of Embodiment 3, it is apparent that so long as the ratio of battery discharge capacity/positive electrode discharge capacity is 0.9 or less, even when the state of charge becomes around 10 to 20%, the IV resistance value does not become very large. In contrast, when the ratio of battery discharge capacity/positive electrode discharge capacity is more than 0.9, at a state of charge of 20% or less, a region in which the internal resistance of the positive electrode active material in the final stage of discharge becomes high, is used, so that the IV resistance value becomes large like the nonaqueous electrolyte secondary battery of Comparative 3. Moreover, in the nonaqueous electrolyte secondary battery of Embodiment 3, the IV resistance value is maintained low and constant over a wide range of the state of charge compared to the nonaqueous electrolyte secondary battery of Comparative 3. The nonaqueous electrolyte secondary battery of Embodiment 3 is therefore suitable as a battery for EVs or HEVs for which particularly satisfactory output properties and satisfactory regeneration properties are required.

Embodiment 4, Comparative 4

The nonaqueous electrolyte secondary batteries of Embodiment 4 and Comparative 4 were produced as follows.

Preparation of Positive Electrode Plate $Li_2CO_3$ and $(Ni_{0.4}Co_{0.3}Mn_{0.3})_3O_4$ were mixed so that the mol ratio of $Li:(Ni_{0.4}Co_{0.3}Mn_{0.3})$ becomes 1:1. Next, this mixture was baked at 900° C. in an air atmosphere for 20 hours and a lithium-transition metal composite oxide represented by $LiNi_{0.4}Co_{0.3}Mn_{0.3}O_2$ having an average particle diameter of 12.4 µm was obtained as the positive electrode active material. The thus-obtained positive electrode active material, carbon as a conductive agent and a PVdF as a binder were added to NMP so that the mass ratio thereof becomes 88:9:3 and kneaded, to thereby prepare a slurry of the positive electrode active material. The thus-prepared positive electrode active material mixture slurry was coated onto an aluminum foil as the positive electrode substrate and was dried to form a positive electrode active material mixture layer. Thereafter, the positive electrode active material mixture layer was rolled using a roller to have a predetermined packing density and was cut into a predetermined size, to thereby prepare a positive electrode plate.

Production of Nonaqueous Electrolyte Secondary Battery

Using the same negative electrode plate and the same nonaqueous electrolytic solution as those in Embodiment 2 and Comparative 2, in substantially the same manner as in Embodiment 1 and Comparative 1, the nonaqueous electrolyte secondary batteries of Embodiment 4 and Comparative 4 were produced. In the obtained nonaqueous electrolyte secondary battery of Embodiment 4, a designed capacity was 5.3 Ah and the ratio of battery discharge capacity/positive electrode discharge capacity was 0.83 and in the nonaqueous electrolyte secondary battery of Comparative 4, a designed capacity was 5.4 Ah and the ratio of battery discharge capacity/positive electrode discharge capacity was 0.92.

IV Resistance Measuring Method

By using batteries of Embodiment 4 and Comparative 4, in substantially the same manner as in Embodiment 1 and Comparative 1, the IV resistance at a predetermined state of charge was measured. The relationship between the state of charge and measured values of the IV resistance in the batteries of Embodiment 4 and Comparative 4 is shown in FIG. 4.

Figure 4:
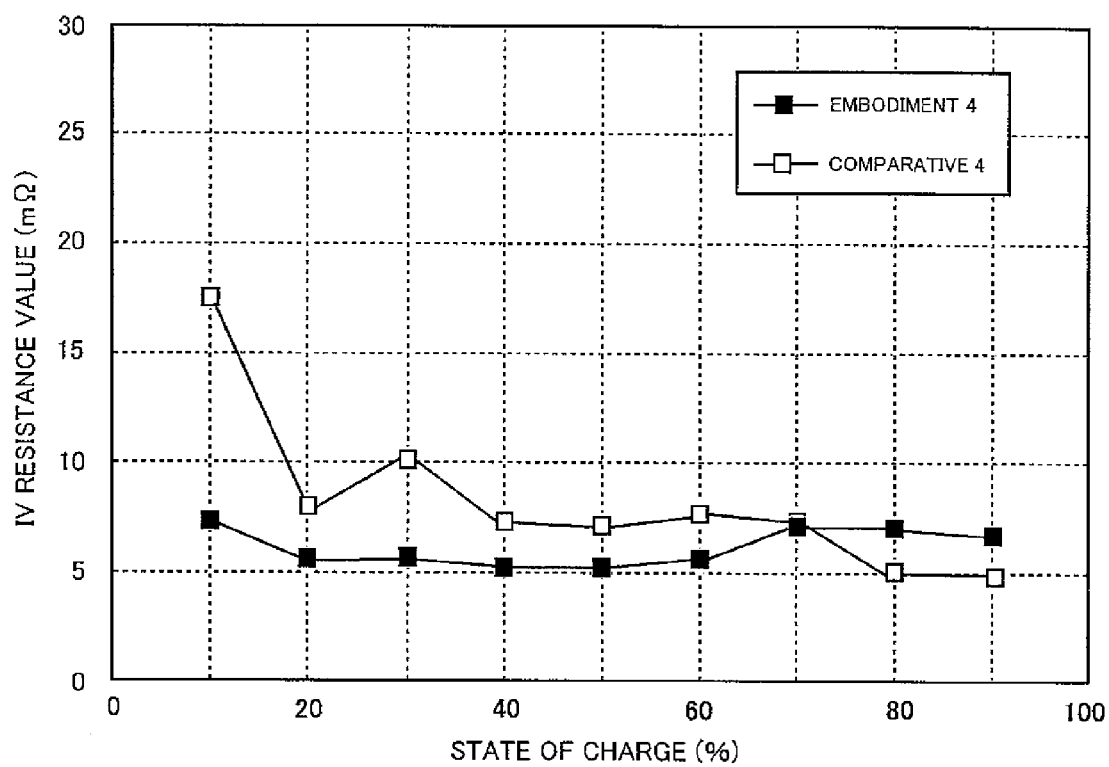
FIG. 4 is a view showing the relationship between the state of charge and measured values of the IV resistance in nonaqueous electrolyte secondary batteries of Embodiment 4 and Comparative 4.

The result shown in FIG. 4 revealed the following features. At a state of charge of 20% or more, the IV resistance value of the nonaqueous electrolyte secondary battery of Embodiment 4 is slightly smaller than that of the nonaqueous electrolyte secondary battery of Comparative 4; however, even when both the states of charge of the nonaqueous electrolyte secondary batteries of Embodiment 4 and Comparative 4 are substantially changed, the IV resistance values of these nonaqueous electrolyte secondary batteries are substantially the same as each other. On the other hand, at a state of charge of less than 20%, with respect to the nonaqueous electrolyte secondary battery of Comparative 4 in which polyimide is not incorporated in the negative electrode active material, even when the positive electrode active material thereof has the same composition as that of the nonaqueous electrolyte secondary battery of Embodiment 4, the IV resistance value is rapidly increased according to its decreasing state of charge.

In contrast, with respect to the nonaqueous electrolyte secondary battery of Embodiment 4 in which polyimide is incorporated in the negative electrode active material, even at a state of charge of less than 20%, until at a state of charge of down to 10%, an increase in the IV resistance value is slight. Even at a state of charge of 10%, the IV resistance value of the nonaqueous electrolyte secondary battery of Embodiment 4 is only about ⅖ of the corresponding value of the nonaqueous electrolyte secondary battery of Comparative 4.

Therefore, with respect to the nonaqueous electrolyte secondary battery of Embodiment 4, it is apparent that so long as the ratio of battery discharge capacity/positive electrode discharge capacity is 0.9 or less, even when the state of charge becomes around 10 to 20%, the IV resistance value does not become very large. In contrast, when the ratio of battery discharge capacity/positive electrode discharge capacity is more than 0.9, at a state of charge of 20% or less, a region in which the internal resistance of the positive electrode active material in the final stage of discharge becomes high, is used, so that the IV resistance value becomes large like the nonaqueous electrolyte secondary battery of Comparative 4. Moreover, in the nonaqueous electrolyte secondary battery of Embodiment 4, the IV resistance value is maintained low and constant over a wide range of the state of charge compared to the nonaqueous electrolyte secondary battery of Comparative 4. The nonaqueous electrolyte secondary battery of Embodiment 4 is therefore suitable as a battery for EVs or HEVs for which particularly satisfactory output properties and satisfactory regeneration properties are required.

In summarizing the results of the above Embodiments 1 to 4 and Comparatives 1 to 4, it is apparent that in the nonaqueous electrolyte secondary batteries of Embodiments 1 to 4 in which polyimide is incorporated in the negative electrode mixture, the IV resistance value is maintained low and constant over a wider range of the state of charge than that in the nonaqueous electrolyte secondary batteries of Comparatives 1 to 4 in which polyimide is not incorporated in the negative electrode mixture. It is also apparent that such a satisfactory advantage is exhibited either when the amount of the polyimide in the negative electrode mixture is 1.4% by mass (Embodiment 1) or 2.0% by mass (Embodiments 2 to 4).

The nonaqueous electrolyte secondary batteries of Embodiments 2 to 4 have different types of the positive electrode active material; however, they have the same composition of the positive and negative electrode mixtures. The results of Embodiments 2 to 4 have revealed that, by incorporating polyimide in the negative electrode mixture, the IV resistance value is maintained low and constant over a wide range of the state of charge irrespective of the type of the positive electrode active material. Such a tendency is caused when as the positive electrode active material, a material having a low initial efficiency, such as $Li_{1+a}Ni_xCo_yM_zO_2$ (wherein M is at least one element selected from Mn, Al, Ti, Zr, Nb, B, Mg and Mo; and $0 \leq a \leq 0.3$, $0.1 \leq x \leq 1$, $0 \leq y \leq 0.5$, $0 \leq z \leq 0.9$, $a+x+y+z=1$) is employed, and when as the negative electrode active material, a material in which a compound having an imide bond is added to carbon having a large initial efficiency is used, which renders the initial efficiency of the negative electrode small.

Further, each of the nonaqueous electrolyte secondary batteries of Embodiments 1 and 4 has the same type of the positive electrode active material; however, among them, the content of the positive electrode active material and the amount of the conductive agent are varied largely. The results of Embodiments 1 and 4 have revealed that the advantage of incorporating polyimide in the negative electrode mixture is caused irrespective of the content of the positive electrode active material and the amount of the conductive agent.

Though in Embodiments 1 to 4, examples using polyimide represented by the above Chemical Formula (I) are shown, when also a polyimide compound represented by the following Chemical Formula (II):

[Chemical Formula 8]

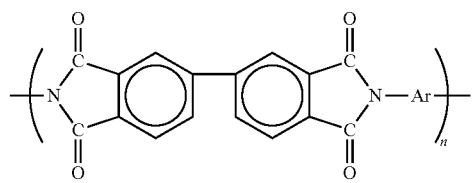

(II)

wherein Ar represents an aryl group, was used, a result having the same tendency as that when a compound of Chemical Formula (I) was used, was obtained.

What is claimed is:

1. A nonaqueous electrolyte secondary battery comprising:
   a lithium-transition metal compound as a positive electrode active material that is capable of intercalating and deintercalating a lithium ion and is represented by $Li_{1+a}Ni_xCo_yM_zO_2$ (wherein M is at least one element selected from Mn, Al, Ti, Zr, Nb, B, Mg and Mo; and $0 \leq a \leq 0.3$, $0.1 \leq x \leq 1$, $0 \leq y \leq 0.5$, $0 \leq z \leq 0.9$, $a+x+y+z=1$); and
   carbon as a negative electrode active material in a negative electrode active material layer that is capable of intercalating and deintercalating a lithium ion, wherein the negative electrode active material layer contains a powder of a compound having an imide bond.

2. The nonaqueous electrolyte secondary battery according to claim 1, wherein a ratio of a discharge capacity of the positive electrode and a discharge capacity of the nonaqueous electrolyte secondary battery is:
   Battery discharge capacity/Positive electrode discharge capacity $\leq 0.9$.

3. The nonaqueous electrolyte secondary battery according to claim 1, wherein the compound having an imide bond is polyimide.

4. The nonaqueous electrolyte secondary battery according to claim 3, wherein the polyimide is a compound represented by the following Chemical Formula (I) or (II):

[Chemical Formula 1]

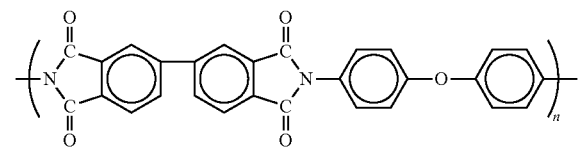

(I)

[Chemical Formula 2]

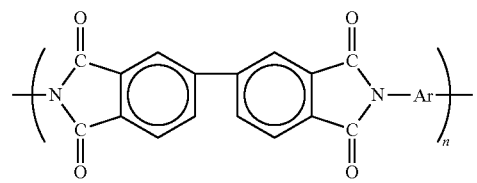

(II)

wherein Ar represents an aryl group.

5. The nonaqueous electrolyte secondary battery according to claim 3, wherein an average particle diameter of the polyimide powder is 0.1 to 15 μm.

6. The nonaqueous electrolyte secondary battery according to claim 1, wherein the positive electrode active material is $Li_{1+a}Ni_xCo_yMn_zO_2$ ($0 \leq a \leq 0.15$, $0.25 \leq x \leq 0.45$, $0.25 \leq y \leq 0.35$, $0.25 \leq z \leq 0.35$, $a+x+y+z=1$).

7. The nonaqueous electrolyte secondary battery according to claim 1, wherein the negative electrode active material is graphite.

8. The nonaqueous electrolyte secondary battery according to claim 1, wherein the negative electrode is produced from a mixture slurry in an aqueous solvent.

9. The nonaqueous electrolyte secondary battery according to claim 1, wherein the compound having an imide bond is selected from polyimide, polyamideimide, polyetherimide, polyesterimide, polyethyleneimide, polypropyleneimide, polyurethaneimide, and polymethacrylimide.

* * * * *